United States Patent
Cascaval et al.

(10) Patent No.: US 7,596,680 B2
(45) Date of Patent: Sep. 29, 2009

(54) SYSTEM AND METHOD FOR ENCODING AND DECODING ARCHITECTURE REGISTERS

(75) Inventors: Gheorghe C. Cascaval, Carmel, NY (US); Siddhartha Chatterjee, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 767 days.

(21) Appl. No.: 10/662,179

(22) Filed: Sep. 15, 2003

(65) Prior Publication Data

US 2005/0060520 A1     Mar. 17, 2005

(51) Int. Cl.
G06F 7/38     (2006.01)
(52) U.S. Cl. ...................................... 712/226
(58) Field of Classification Search ................. 712/213, 712/300, 229, 217, 226
See application file for complete search history.

(56) References Cited

U.S. PATENT DOCUMENTS

| | | | | |
|---|---|---|---|---|
| 4,361,868 A | * | 11/1982 | Kaplinsky | 711/2 |
| 4,453,212 A | * | 6/1984 | Gaither et al. | 711/2 |
| 4,466,056 A | * | 8/1984 | Tanahashi | 711/206 |
| 4,574,349 A | | 3/1986 | Rechtschaffen | |
| 5,577,259 A | * | 11/1996 | Alferness et al. | 712/41 |
| 6,072,508 A | * | 6/2000 | Devic | 345/553 |

OTHER PUBLICATIONS

Tokuzo Koyohara, et al.; "Register Connection: A New Approach to Adding Registers into Instruction Set Architectures;" 1993, IEEE. Published in the US.

* cited by examiner

Primary Examiner—Eddie P Chan
Assistant Examiner—John Lindlof
(74) Attorney, Agent, or Firm—Michael J. Buchenhorner; Douglas W. Cameron

(57) ABSTRACT

A system and method to extend the number of architecturally visible registers in a processor while preserving the number of bits of the instruction encoding. The system comprises: an indirection table that encodes register patterns for the registers used in an instruction; instructions to load and store such table entries; a mechanism to identify instructions that use the indirection table; and a mechanism to identify a set of bits in instructions that are used to index into the indirection table. According to another embodiment, a method of encoding registers in a computer instruction comprises constructing a table having a plurality of entries. Each entry specifies a combination of a plurality of registers. The method also comprises generating an instruction having a reference to one of the entries in the table. The method then comprises accessing the plurality of registers specified by the referenced table entry. The method further comprises merging said number of registers into an expanded instruction that is used for remaining stages of instruction processing.

4 Claims, 4 Drawing Sheets

SYSTEM AND METHOD FOR ENCODING AND DECODING ARCHITECTURE REGISTERS

STATEMENT REGARDING FEDERALLY SPONSORED-RESEARCH OR DEVELOPMENT

The research was sponsored by HPCS contract number NBCH020056 and ends Sep. 16, 2003.

CROSS-REFERENCE TO RELATED APPLICATIONS

Not Applicable.

INCORPORATION BY REFERENCE OF MATERIAL SUBMITTED ON A COMPACT DISC

Not Applicable.

FIELD OF THE INVENTION

The invention disclosed broadly relates to the field of information processing systems and more particularly relates to a system and method for increasing the number of architecturally visible registers in a central processing unit (CPU).

BACKGROUND OF THE INVENTION

Most current CPU architectures, including the PowerPC™ architecture, limit the number of architecturally visible registers (both general purpose registers, or GPRs, and floating point registers, or FPRs) to a small number N (with N≦32 in general for RISC architectures). While these architectural registers may be backed up by a larger pool of physical renaming registers, the compiler (or assembly language programmer) must make register allocation and spilling decisions using only (N-K) general-purpose registers, where K is the number of registers reserved for specific uses by the application binary interface. This limitation on the number of architected registers increases register pressure, increases the number of register spills and restores, and limits the use of program transformations requiring a large number of registers (such as unroll-and-jam).

Fixed length instructions and dense instruction encoding are key features of RISC architectures. For example, the PowerPC™ ISA (instruction set architecture) uses 32 bits to encode an instruction, with five bits allocated for each register specifier. In this architecture, instructions have between one and four register sources and destinations, such that there are only 12 bits remaining to encode the operation. Instruction encoding is tight, so that any attempt to increase the width of the register specifier fields would result either in longer instructions and code bloat, or in two-address instructions rather than the traditional RISC three-address instructions. We now discuss some known solutions to the problem of encoding register specifiers to increase the number of usable registers.

Register Windows in the Sparc™ Architecture

Several register contexts are maintained to improve the performance of function call and return. However, while there may be more than N physical registers present in the machine, only N of them are architecturally visible and available for use at any point in time. The Zilog Z80 8-bit microprocessor had a primitive version of this feature in the form of two sets of registers that could be rapidly exchanged with one instruction.

Register Renaming in Super-scalar Processors

More than N registers are physically present in super-scalar processors, but these registers are invisible to the user, being used by the hardware to transparently and dynamically map the N architecturally visible registers over time. The user does not have direct control over the management of this pool of registers.

Rotating Register File

The IA64 register file contains 128 architected registers encoded using 7 bit register specifier fields. This results in an instruction word that is 41 bits long, resulting in reduced code density.

The Rechtschaffen Patent

U.S. Pat. No. 4,574,349 (issued to Rechtschaffen) interprets the register specifiers in an instruction as indices into an indirection table from which the actual register numbers are obtained. This solution suffers from the following drawbacks: (a) the indices to the indirection table are still limited to being log N bits wide—this makes the solution similar to a user managed register renaming scheme; (b) Rechtschaffen encodes each register field independently, which requires either multiple indirection tables or multiple access ports into a shared indirection table. A related solution is proposed in the ISCA '93 paper by Kiyohara et al., titled "Register Connections: A New Approach to Adding Registers into Instruction Set Architectures."

The Glossner Patent

U.S. Pat. No. 6,665,790 (issued to Glossner et al.) discloses a mechanism to address a vector register file through a pointer array. Each entry in the pointer array identifies at least one entry in the storage array (the vector register file). The main benefit of the pointer array is that it allows access to any set of registers, possibly a different set for each of the operands. In this solution, instructions still address registers (or pointer array entries) individually and not as a pattern, therefore suffering from the an instruction size limitation when trying to address a large register file.

There is thus a need for a method and system for encoding and decoding architected registers that overcomes the shortcomings of the prior art.

SUMMARY OF THE INVENTION

A system and method to extend the number of architecturally visible registers in a processor while preserving the number of bits of the instruction encoding. The system comprises: an indirection table whose entries encode register patterns for registers used by instructions; instructions to load and store register patterns to and from the indirection table; a mechanism to identify instructions that use the indirection table; and a mechanism to identify a set of bits in instructions that are used to index into the indirection table.

According to another embodiment, a method of encoding registers in a computer instruction comprises constructing a table having a plurality of entries. Each entry specifies a combination of a plurality of registers. The method also comprises generating an instruction having a reference to one of the entries in the table. The method then comprises accessing the plurality of registers using the reference in the table. The method further comprises merging said number of registers into an expanded instruction that is used for remaining stages of instruction processing.

DETAILED DESCRIPTION

The invention solves the problem of designing or enhancing the instruction set architecture (ISA) of a processor by increasing the number of architected registers, while fulfilling the following requirements: a) continuing to encode instructions in the architected instruction width; b) preserving the three-address nature of instructions; and when applied to an existing ISA; c) maintaining backwards compatibility, to allow existing binaries to execute unmodified on implementations of the new ISA, while being able to access only the bottom N registers (this requirement is vacuous when the invention is applied to a new ISA).

While in existing implementations of the PowerPC™ architecture 15 bits of the instruction are allocated for three register specifiers, programs do not use, and compilers do not generate, anywhere close to the $2^{15}$ possible combinations of register specifiers. Thus, while the encoding of each register specifier is dense, the encoding of register specifier tuples is sparse. An ordered tuple of register specifiers occurring in a program is hereinafter referred to as a Register Access Pattern (RAP). Analysis of the SPECcpu2000 benchmarks shows 1000-3000 static RAPs per benchmark. Of the thousands of RAPs, a small number account for most of the dynamic references made by a program.

Thus a system according to the invention uses RAPs to enhance a processor architecture and its corresponding ISA with four components: an architecturally visible Register Access Pattern Table (RAPT), which is used as an indirection table for RAPs; instructions to explicitly load and store RAPT entries; a method of identifying instructions that use the RAPT; and a set of bits in instructions that are used to index into the RAPT.

The RAPT

A RAPT entry comprises a plurality of register specifiers that together encode one or more RAPs. The number M of register specifiers in a RAPT entry is hereinafter called the RAPT width. For example, assuming a RAPT width M=4 consider Table 1 below.

TABLE 1

| RAPT index | RAPT entry |
|---|---|
| 1 | 1, 2, 3, 4 |
| 10 | 2, 3, 42, 69 |
| 31 | 128, 130, 141, 255 |

The first column is the location of the RAP in the RAPT. The second column is the contents of the RAP. Thus, entry 1 of the RAPT contains the four numbers 1, 2, 3, and 4, which identify architectural register numbers to be used by an instruction accessing RAPT entry 1.

The number of addressable registers is determined by the width of each field of a RAPT entry, hereinafter called the implementation width. An implementation width of W bits allows the addressing of $2^W$ architectural registers. This limit is 256 for W=8 (32-bit RAPT entries for M=4) and 65536 for W=16 (64-bit RAPT entries for M=4). The number of bits used to index the RAPT is hereinafter denoted as B. The number of RAPT entries is therefore $2^B$.

Figure 1:
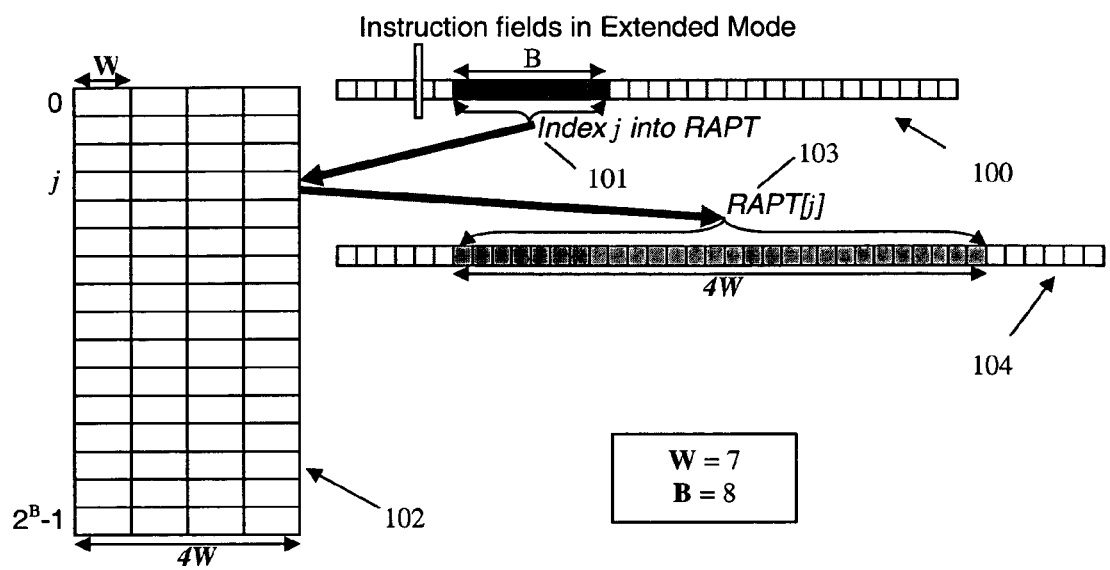
FIG. 1 is an example of use of an indirection table (RAPT) by an instruction using a contiguous RAPT index field and merging in four register specifiers retrieved from the RAPT entry.

Referring to FIG. 1 there is shown an example of use of a RAPT by an instruction using a contiguous RAPT index field and merging in four register specifiers retrieved from the RAPT entry. An instruction 100 is processed by reading the RAPT index field 101. This field comprises an index that references entry j of the RAPT 102. The RAPT 102 is a table comprising four columns, each having a width W, and $2^B$ rows. In this example the register specifier field 101 comprises eight bits (i.e., B=8). Those bits are used to identify RAPT entry j which comprises four register specifier segments each having seven bits, a total of 28 bits to characterize a register tuple. The resulting extended instruction 104 allows for many more architecturally visible registers being available for programming.

RAPT Management Instructions

We provide the following instructions to manage the RAPT: (a) An instruction that, given a RAPT index and a memory address, loads the contents of the memory address into the RAPT entry specified by the index; (b) An instruction that, given a RAPT index and a memory address, stores into said memory address the contents of the RAPT entry specified by the index; and (c) Optionally, instructions may be provided for loading and storing all entries of the RAPT from/to a base memory address.

Identification of Instruction Mode

When applied to an existing ISA, the invention provides a mechanism, either explicit or implicit, to indicate for each instruction whether to interpret its register access fields directly (hereinafter referred to as compatibility mode), or using indirection through the RAPT (hereinafter referred to as extended mode). A correctness criterion for this mechanism is that it must interpret each instruction of an existing binary as being in compatibility mode. This mechanism includes, but is not limited to, the following situations: always using the RAPT (implicitly); never using the RAPT (implicitly); specifying a mode on a per instruction basis (explicitly); and specifying the mode of a group of instructions with a single mode context (the context is toggled explicitly, the classification of individual instructions is implicit).

Identification of RAPT Index Field

A system according to the invention requires the ISA to specify, for each instruction, a plurality of B bits that are used to identify the RAPT entry to be used by an instance of that instruction (unconditionally, when the invention is applied to a new ISA; in extended mode, when the invention is applied to an existing ISA). These bits do not need to be contiguous in the instruction word. The collection of these bits is hereinafter called the RAPT index field of the instruction (e.g., FIG. 1, 101).

Instruction Processing

Figure 2:
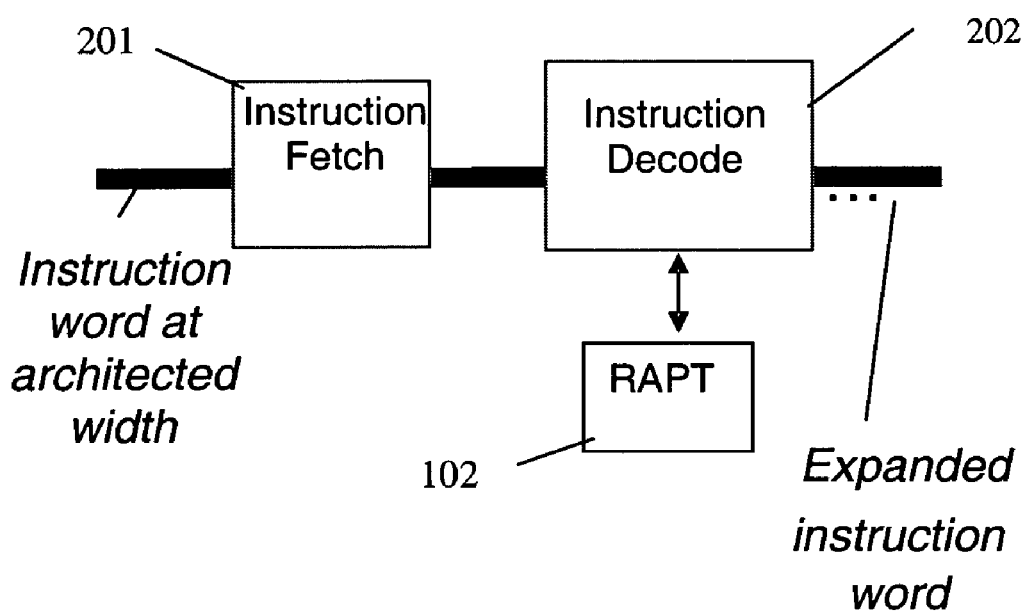
FIG. 2 shows the location of the RAPT in an instruction processing pipeline.

Referring to FIG. 2, there is shown the location of the RAPT in an instruction processing pipeline. The enhanced architecture operates in the following manner: Instructions are always fetched (201) in the architected instruction width specified by the ISA. Register specifiers are then expanded to the implementation width W as instructions are decoded (202), following one of two possible paths. Either the instruction is executed in compatibility or extended mode. In the extended mode, the instruction is converted to an expanded instruction word.

Figure 3:
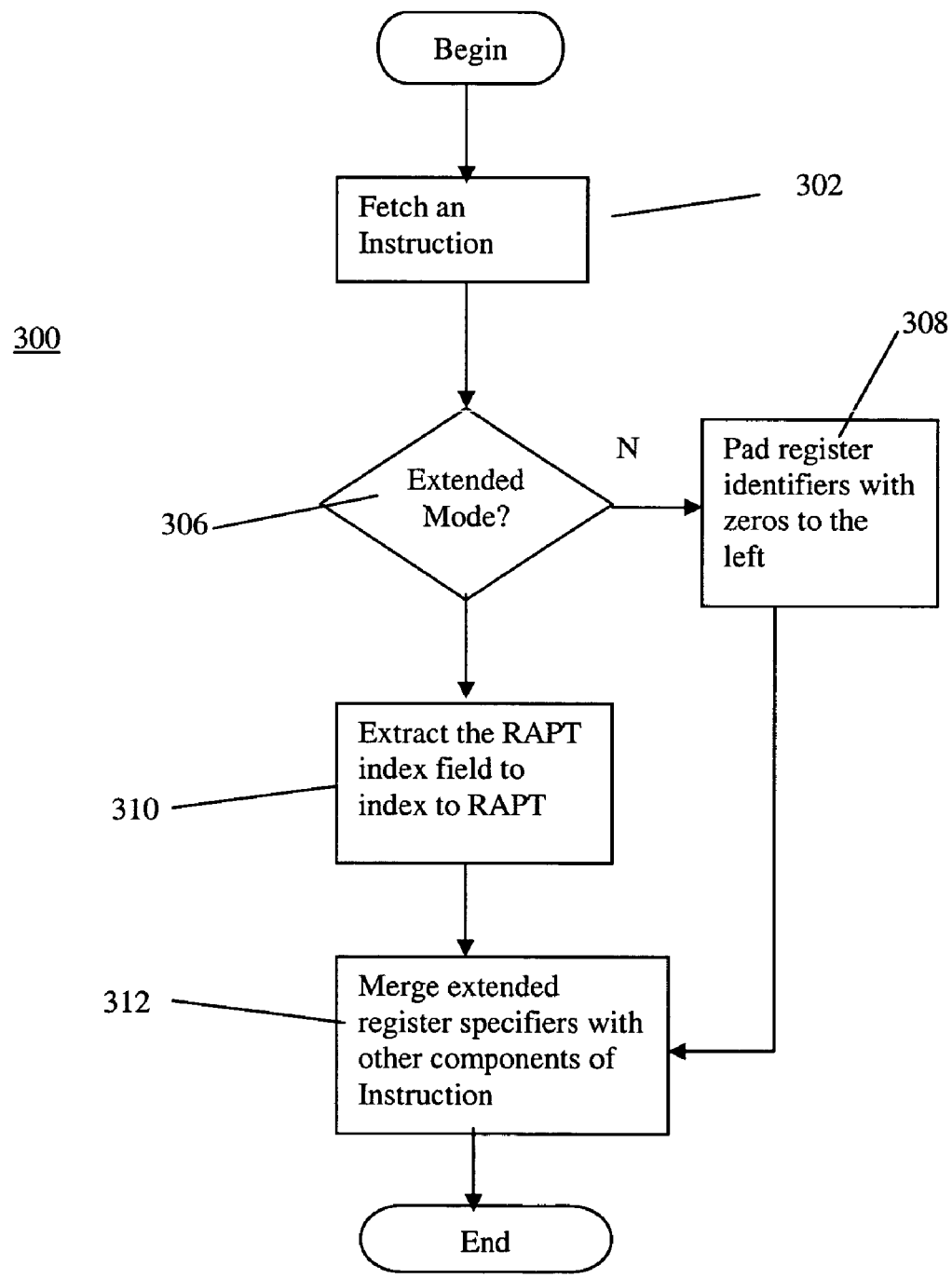
FIG. 3 is a flow chart illustrating a method according to the invention.

Referring to FIG. 3, there is shown a process 300 according to an embodiment of the invention. In step 302 an instruction is fetched from memory for processing. A decision 306 is then made to determine whether the fetched instruction is to be processed in compatibility mode or in extended mode. For an instruction in compatibility mode, in step 308 the register specifiers are extended to the implementation width W by padding with zeros to the left. Only registers 0 through (N−1) are accessible in this case. This path is relevant only in the case when the invention is applied to an existing ISA.

For an instruction in extended mode, in step 310 the decoder extracts the RAPT index field of the instruction, uses it to index into the RAPT, and obtains the register specifiers from said RAPT entry. The specifiers are already represented at implementation width W.

In step 312 an appropriate number of extended register specifiers is merged with the remaining components of the instruction (i.e., after the register specifiers are extracted) and provided to the remainder of the instruction processing hardware. The actual number of register specifiers merged may vary from instruction to instruction; it is permissible for two instructions accessing the same RAPT entry to merge different numbers of register specifiers.

Figure 4:
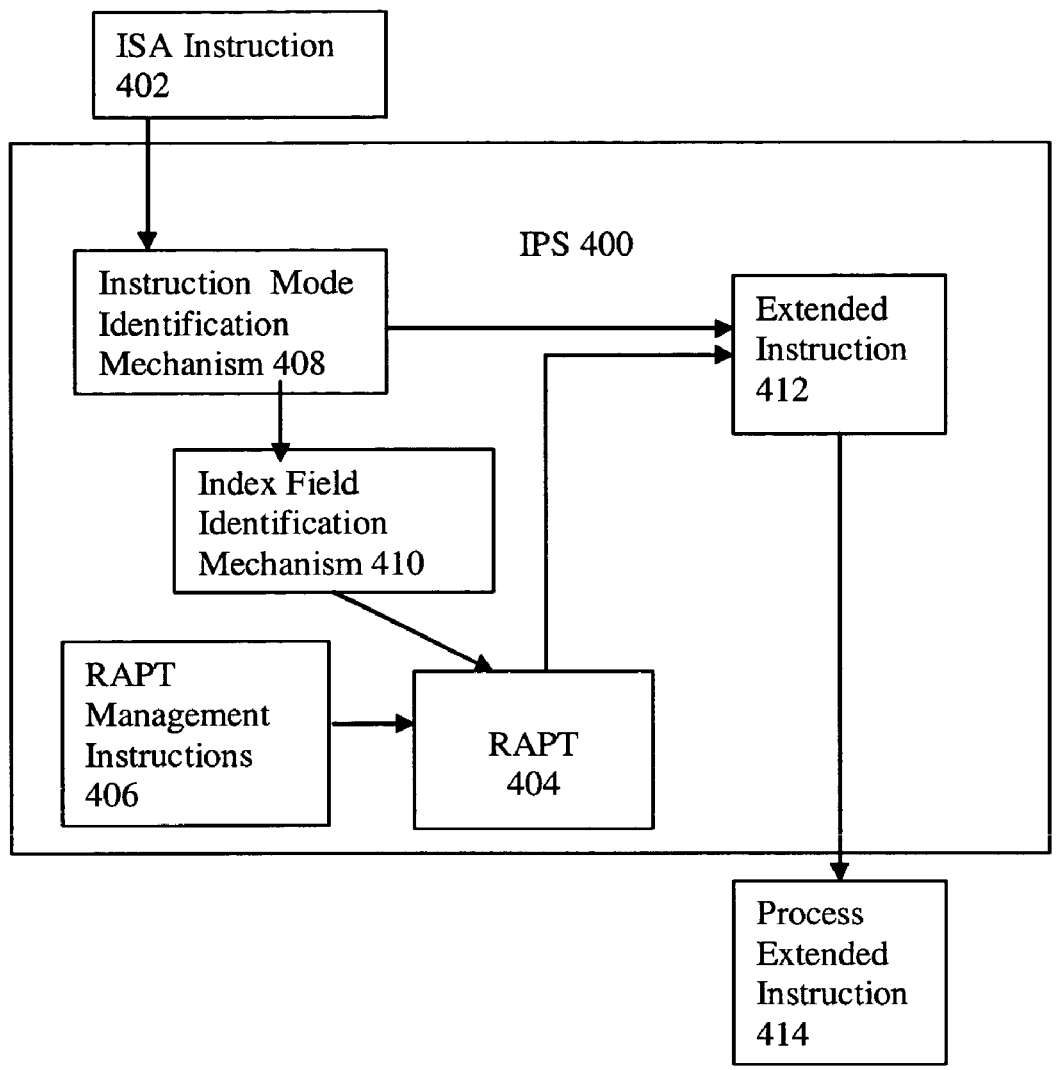
FIG. 4 is a simplified block diagram of an information processing system comprising an embodiment of the invention.

FIG. 4 is a simplified block diagram of a processor 400 according to an embodiment of the invention. The processor 400 comprises an input for fetching an ISA instruction 402 from memory. The processor 400 also comprises an indirection table (RAPT) 404 for storing register numbers as discussed in reference to FIG. 1. A set of instructions (RAPT Management Instructions) 406 for loading and storing RAPT entries is embedded in memory within the processor 400. A mechanism 408 identifies instructions that use the RAPT. A mechanism 410 is used to identify a set of bits in instructions that are used to index into the RAPT. The Instruction Mode Identification Mechanism 408 in conjunction with the RAPT are used to produce the extended instruction 412 (as discussed with respect to FIG. 1). The extended instruction is then processed (414) for merging a number of registers into an expanded instruction that is used for remaining stages of instruction processing.

What has been shown and discussed is a highly-simplified depiction of a programmable computer apparatus. Those skilled in the art will appreciate that other low-level components and connections are required in any practical application of a computer apparatus.

What is claimed is:

1. A method comprising:
   encoding ordered tuples of register specifiers of addressable registers for specifying a plurality of fields of an instruction of fixed length, wherein each ordered tuple comprises all the register specifiers in the instruction;
   loading into an indirection table a plurality of entries that encode register patterns for registers used by the instruction, each entry specifying one of the ordered tuples of register specifiers, wherein an amount of the addressable registers is specified by a width of each field of the entry in the indirection table;
   fetching the instruction from memory for processing, wherein said instruction is fetched in an architected instruction width specified by an instruction set architecture;
   determining whether the instruction is to be processed in compatibility mode or in extended mode;
   if the instruction is to be processed in compatibility mode, extending the register specifiers to implementation width by padding the registers with zeroes to the left;
   if the instruction is to be processed in extended mode:
     extracting a first field of the instruction as specified by the instruction set architecture;
     using the first field to index into the indirection table; and
     obtaining the register specifiers from the indirection table entry, wherein the register specifiers from the indirection table entry are extended to implementation width;
   merging an appropriate number of extended register specifiers with remaining components of the instruction into an expanded instruction for further instruction processing; and
   providing the extended register specifiers for subsequent processing of the expanded instruction.

2. The method of claim 1 further comprising steps of:
   allocating an indirection table entry;
   storing the register values in said indirection table entry; and
   generating a new instruction that uses said indirection table entry.

3. The method of claim 1 further comprising a step of converting said instruction into the new instruction using the indirection table.

4. The method of claim 1 further comprising a step of converting a three-address instruction into the instruction that uses the indirection table.

* * * * *

UNITED STATES PATENT AND TRADEMARK OFFICE
CERTIFICATE OF CORRECTION

PATENT NO. : 7,596,680 B2  Page 1 of 1
APPLICATION NO. : 10/662179
DATED : September 29, 2009
INVENTOR(S) : Cascaval et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1003 days.

Signed and Sealed this

Twenty-eighth Day of September, 2010

David J. Kappos
*Director of the United States Patent and Trademark Office*